United States Patent
Gonze et al.

(10) Patent No.: US 8,205,441 B2
(45) Date of Patent: Jun. 26, 2012

(54) ZONE HEATED INLET IGNITED DIESEL PARTICULATE FILTER REGENERATION

(75) Inventors: Eugene V. Gonze, Pinckney, MI (US); Frank Ament, Troy, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 1066 days.

(21) Appl. No.: 11/561,100

(22) Filed: Nov. 17, 2006

(65) Prior Publication Data

US 2007/0220870 A1 Sep. 27, 2007

Related U.S. Application Data

(60) Provisional application No. 60/786,062, filed on Mar. 24, 2006.

(51) Int. Cl.
*F01N 3/10* (2006.01)
(52) U.S. Cl. ............... 60/300; 60/274; 60/275; 60/295; 60/297; 60/303
(58) Field of Classification Search ............... 60/274, 60/275, 278, 280, 286, 295, 300, 303, 311, 60/297
See application file for complete search history.

(56) References Cited

U.S. PATENT DOCUMENTS

| 4,505,107 A | * | 3/1985 | Yamaguchi et al. | ............ 60/303 |
| 4,505,726 A | | 3/1985 | Takeuchi | |
| 4,516,993 A | | 5/1985 | Takeuchi | |
| 4,535,589 A | * | 8/1985 | Yoshida et al. | ................. 60/303 |
| 4,671,058 A | * | 6/1987 | Yoshida et al. | ................. 60/303 |
| 5,277,937 A | | 1/1994 | Bagley et al. | |
| 5,423,904 A | * | 6/1995 | Dasgupta | ........................ 96/146 |
| 5,595,580 A | * | 1/1997 | Kawamura | ...................... 55/288 |
| 6,120,583 A | * | 9/2000 | Saito et al. | ....................... 95/278 |
| 6,660,068 B1 | * | 12/2003 | Garner et al. | ................... 95/283 |
| 6,736,870 B2 | * | 5/2004 | Best et al. | .................... 55/282.3 |

FOREIGN PATENT DOCUMENTS

DE 4422198 A1 1/1996

OTHER PUBLICATIONS

U.S. Appl. No. 11/233,450, filed Sep. 22, 2005.

* cited by examiner

*Primary Examiner* — Binh Q Tran

(57) ABSTRACT

An exhaust system that processes exhaust generated by an engine is provided. The system includes: a particulate filter (PF) that is disposed downstream of the engine and that filters particulates from the exhaust; and a grid that includes electrically resistive material that is segmented by non-conductive material into a plurality of zones and wherein the grid is applied to an exterior upstream surface of the PF.

18 Claims, 6 Drawing Sheets

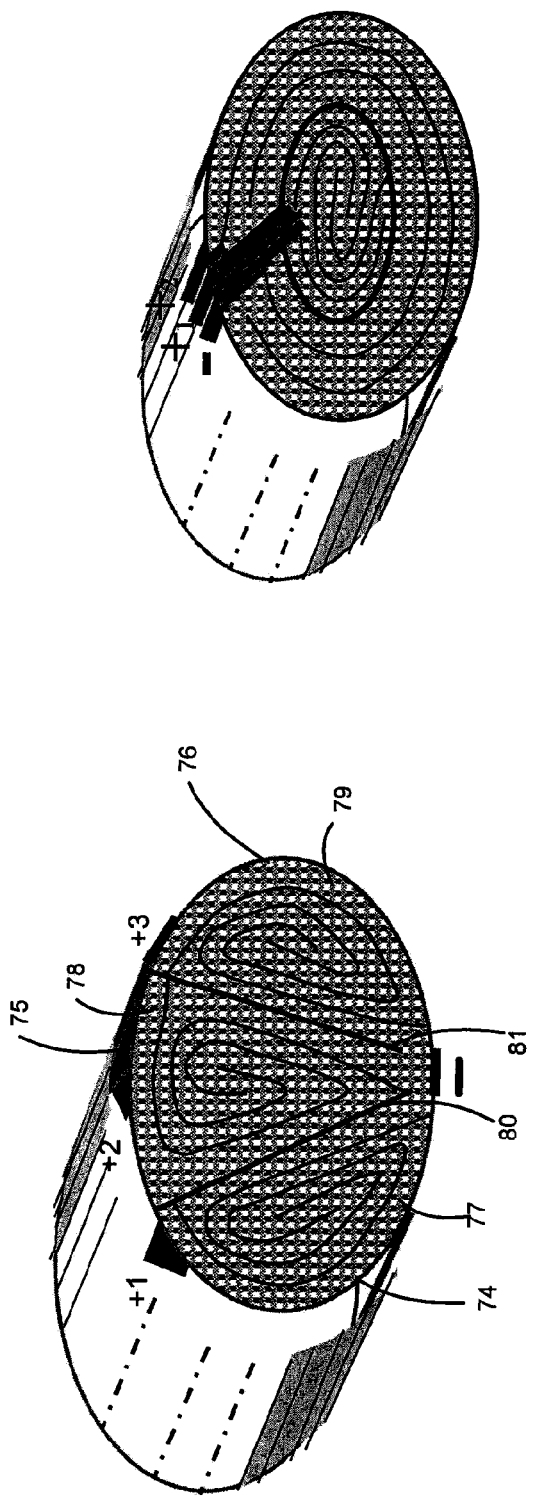
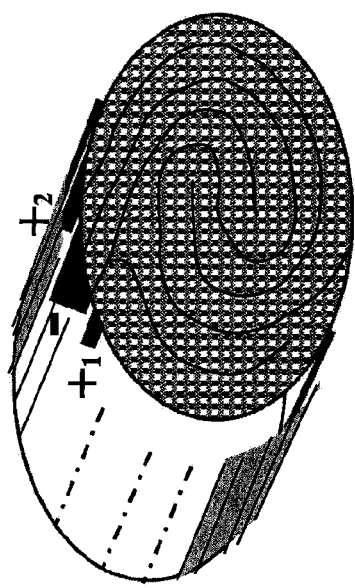
Figure 4A
Figure 4B
Figure 4C

ZONE HEATED INLET IGNITED DIESEL PARTICULATE FILTER REGENERATION

CROSS-REFERENCE TO RELATED APPLICATIONS

This application claims the benefit of U.S. Provisional Application No. 60/786,062, filed on Mar. 24, 2006. The disclosure of the above application is incorporated herein by reference.

STATEMENT OF GOVERNMENT RIGHTS

Certain of the subject matter of the present application was developed under Contract Number DE-FC-04-03AL67635 awarded by the Department of Energy. The U.S. government has certain rights in this invention.

FIELD

The present disclosure relates to methods and systems for heating particulate filters.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust gas by a particulate filter (PF) that is disposed in the exhaust stream. Over time, the PF becomes full and the trapped diesel particulates must be removed. During regeneration, the diesel particulates are burned within the PF.

Conventional regeneration methods inject fuel into the exhaust stream after the main combustion event. The post-combustion injected fuel is combusted over one or more catalysts placed in the exhaust stream. The heat released during the fuel combustion on the catalysts increases the exhaust temperature, which burns the trapped soot particles in the PF. This approach, however, can result in higher temperature excursions than desired, which can be detrimental to exhaust system components including the PF.

SUMMARY

Accordingly, an exhaust system that processes exhaust generated by an engine is provided. The system includes: a particulate filter (PF) that is disposed downstream of the engine and that filters particulates from the exhaust; and a grid that includes electrically resistive material that is segmented by non-conductive material into a plurality of zones and wherein the grid is applied to an exterior upstream surface of the PF.

In other features, an exhaust system that processes exhaust generated by an engine to regenerate a particulate filter is provided. The system includes: a particulate filter (PF) that is disposed downstream of the engine and that filters particulates from the exhaust; a grid that includes electrically resistive material that is segmented by non-conductive material into a plurality of zones and wherein the grid is applied to an exterior upstream surface of the PF; a plurality of switches disposed between a power source and the plurality of zones; and a control module that selectively activates and deactivates the plurality of switches to supply electrical energy to selectively heat the plurality of zones wherein the heat initiates regeneration of particulates in the PF.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 4A-4C are perspective views of front faces of particulate filters.

DETAILED DESCRIPTION

Figure 1:
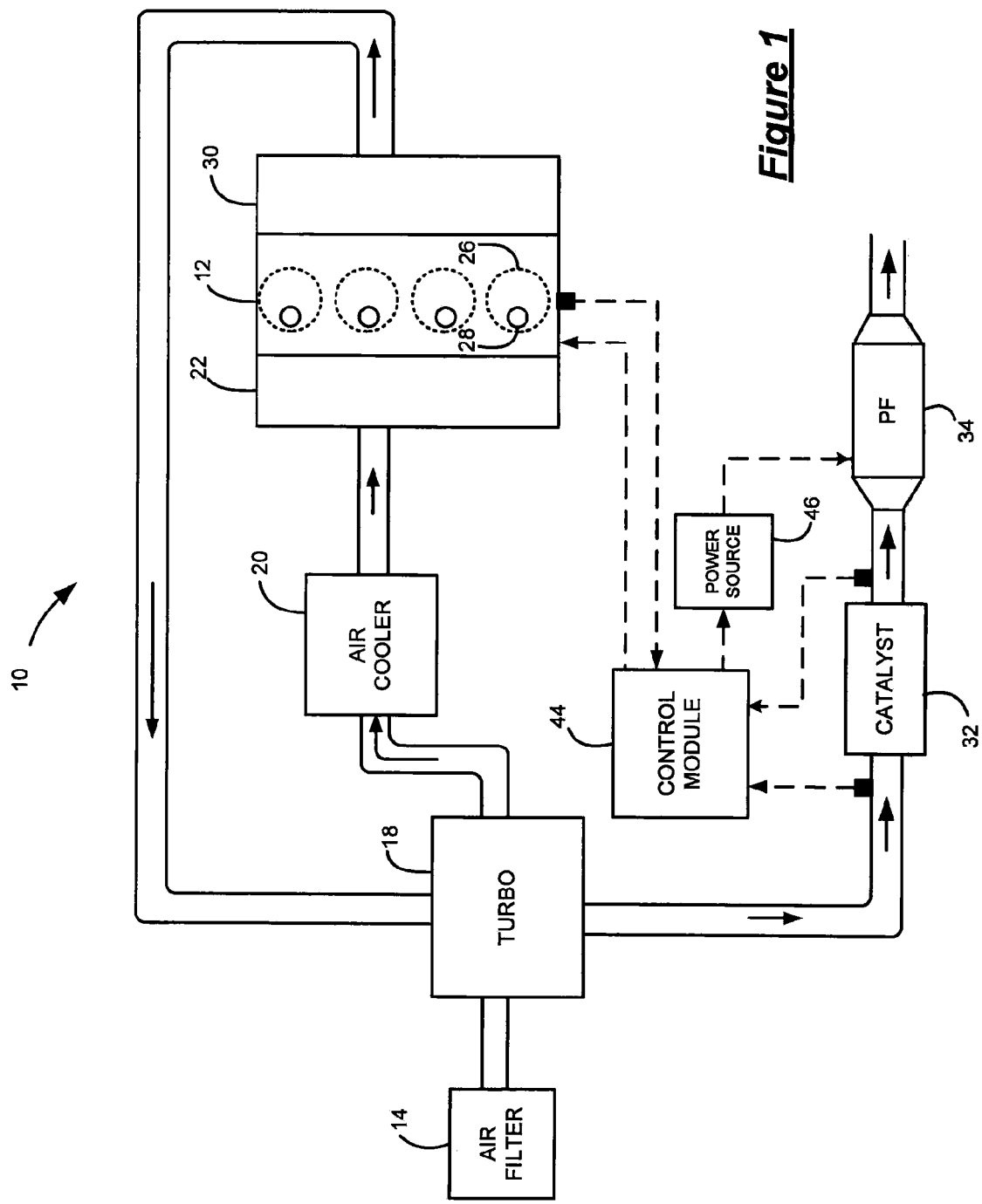
FIG. 1 is a functional block diagram of a vehicle including a particulate filter.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1 an exemplary diesel engine system 10 is schematically illustrated in accordance with the present invention. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present invention can be implemented in engines having a plurality of cylinders including, but not limited to, 2, 3, 4, 5, 6, 8, 10 and 12 cylinders. It is also appreciated that the systems and methods of the present invention can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32 and the PF 34. The DOC 32 oxidizes the exhaust based on the post combustion air/fuel ratio. The amount of oxidation increases the temperature of the exhaust. The PF 34 receives exhaust from the DOC 32 and filters any soot particulates present in the exhaust.

A control module 44 controls the engine and PF regeneration based on various sensed information. More specifically, the control module 44 estimates loading of the PF 34. When the estimated loading achieves a threshold level (e.g., 5 grams/liter of particulate matter) and the exhaust flow rate is within a desired range, current is controlled to the PF 34 via a power source 46 to initiate the regeneration process. The duration of the regeneration process varies based upon the amount of particulate matter within the PF 34. It is anticipated, that the regeneration process can last between 4-6 minutes. Current is only applied, however, during an initial portion of the regeneration process. More specifically, the electric energy heats the face of the PF for a threshold period (e.g., 1-2 minutes). Exhaust passing through the front face is heated. The remainder of the regeneration process is achieved using the heat generated by combustion of particulate matter present near the heated face of the PF 34 or by the heated exhaust passing through the PF.

Figure 2:
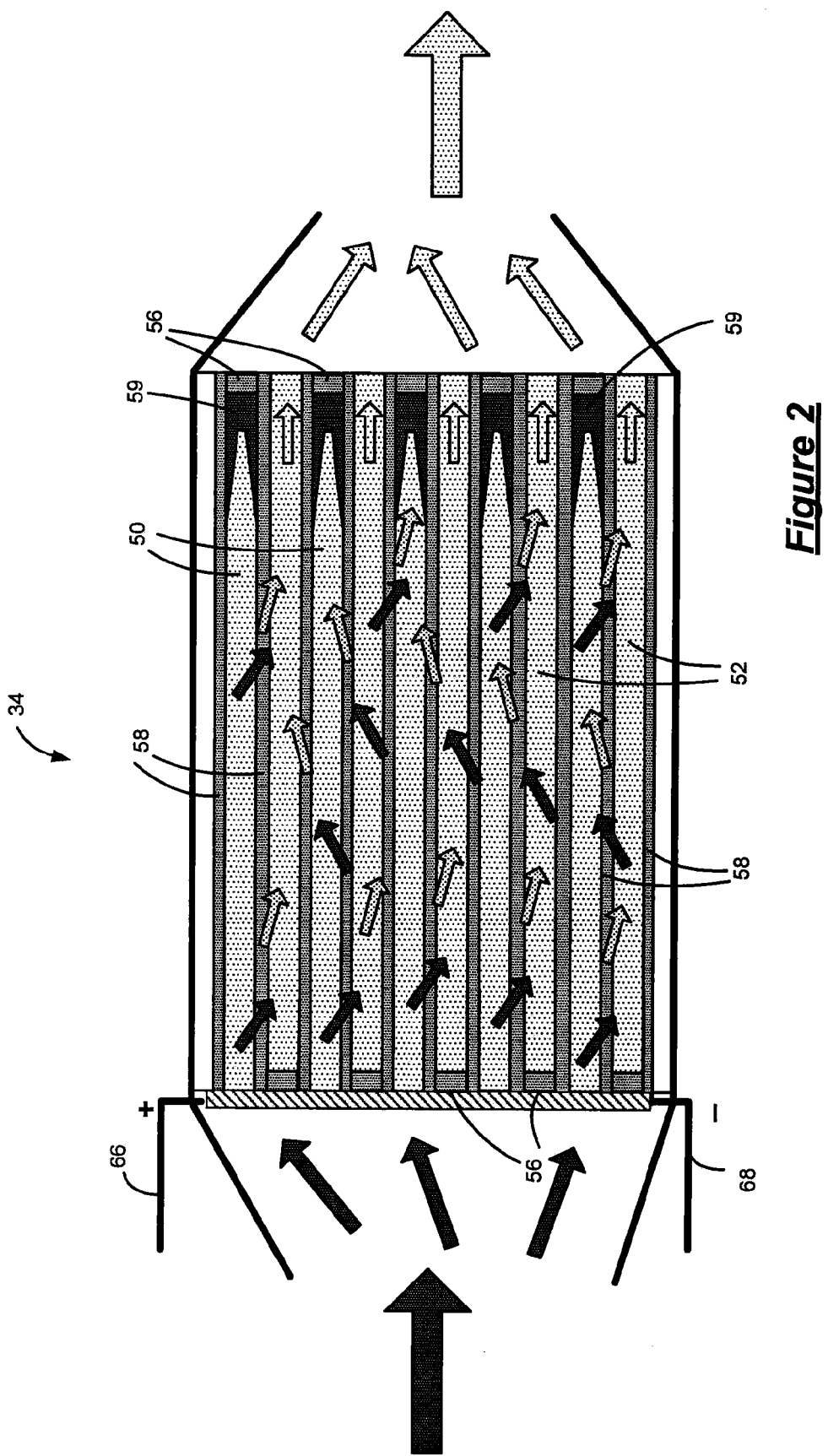
FIG. 2 is a cross-sectional view of a wall-flow monolith particulate filter.
Figure 3:
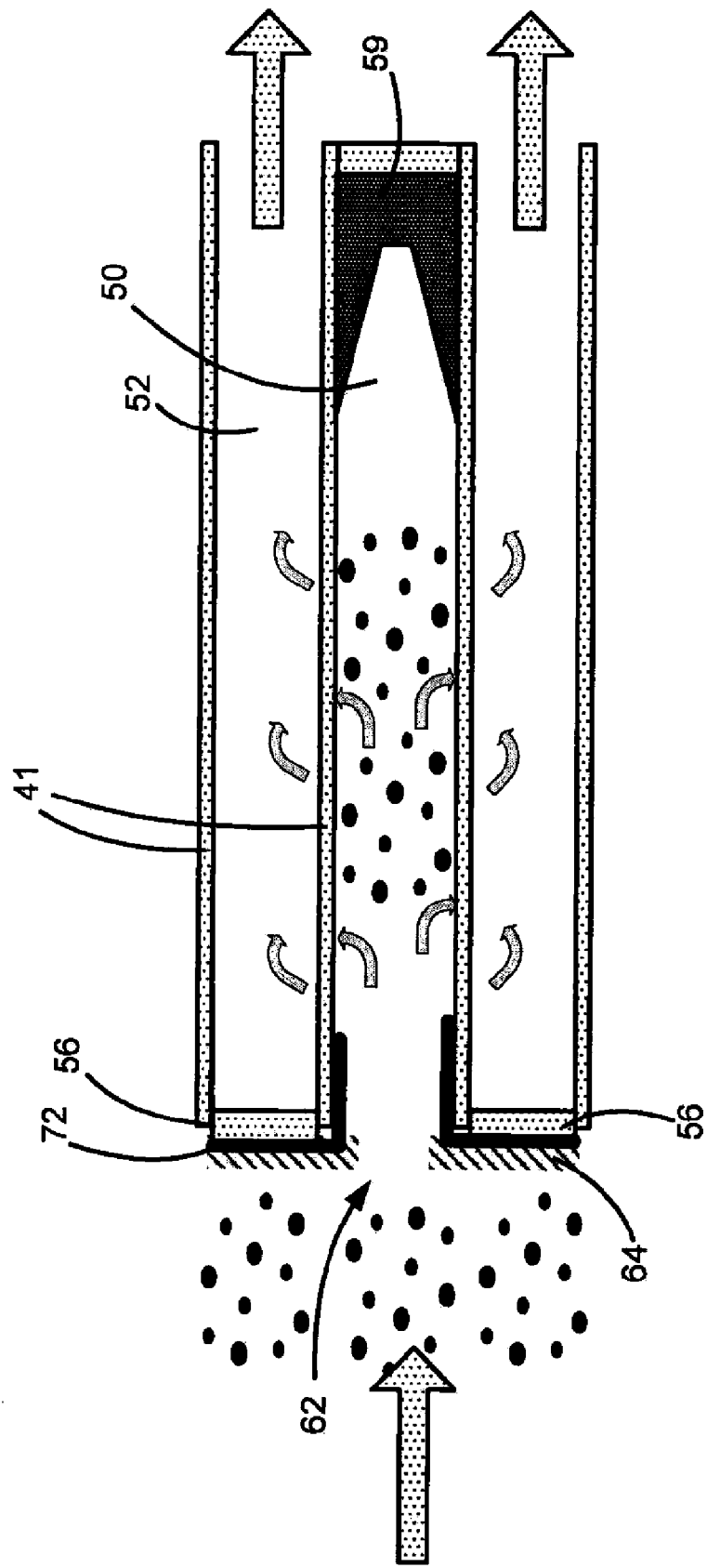
FIG. 3 is a cross-sectional view of a portion of the particulate filter of FIG. 2.

With particular reference to FIGS. 2 and 3, the PF 34 is preferably a monolith particulate trap and includes alternating closed cells/channels 50 and opened cells/channels 52. The cells/channels 50, 52 are typically square cross-sections, running axially through the part. Walls 58 of the PF 34 are preferably comprised of a porous ceramic honeycomb wall of cordierite material. It is appreciated that any ceramic comb material is considered within the scope of the present invention. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Soot particles 59 flow into the PF 34 and are trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid is composed of electrically resistive material such as stainless steel and attached to the PF using a ceramic adhesive. It is also appreciated that the resistive material may be applied in various single or multi-path patterns. Exhaust passing through the PF 34 carries thermal energy generated at the front face of the PF 34 a short distance down the channels 50, 52. The increased thermal energy ignites particulate matter present near the inlet of the PF 34. The heat generated from the combustion of the particulates is then directed through the PF to induce combustion of the remaining particulates within the PF.

With particular reference to FIG. 3, a thermally conductive coating 72 can be additionally applied at the inlets 62 of the channels 50, 52. The coating 72 can extend a short distance down the opened ends of the closed channels 50. In various embodiments, the conductive coating extends within an inch of the front face of the PF. The resistive material of the grid 64 contacts the conductive coating 72. Thermal energy is transferred to the conductive coating 72 when electrical energy passes through the resistive material. Heat from the conductive coating 72 ignites particulate matter present near the inlet of the PF 34.

With reference to FIGS. 4A, 4B, and 4C, to reduce the electrical impact on the system during regeneration, the grid 64 can be segmented into a plurality of zones. Each zone can be heated separately by supplying power to a pathway of resistive material located within each zone. The zones are separated by non-conductive material. It is appreciated that the front face of the PF may be heated by zones segmented in a variety of forms as illustrated by FIGS. 4A-4C.

For example, as shown in FIG. 4A a PF could be zoned into equally divided segments for the ease of vehicle integration. Zones such as those illustrated in 4B, which form concentric circles could be used to mimic flow patterns. Also, the PF my be segmented according to zones shown in FIG. 4C where the resistive material can be dispersed more uniformly in order to more evenly heat the face of the PF 34. This strategy minimizes the heating area but utilizes the fact that soot combustion broadens to adjacent channels as it travels down the length of the PF 34. Therefore, maximizing the total particulate matter consumed while minimizing the heated area and electrical power. Within each zone, it is also appreciated that the resistive pathways may be formed according to various single path and multi-path patterns.

Figure 5:
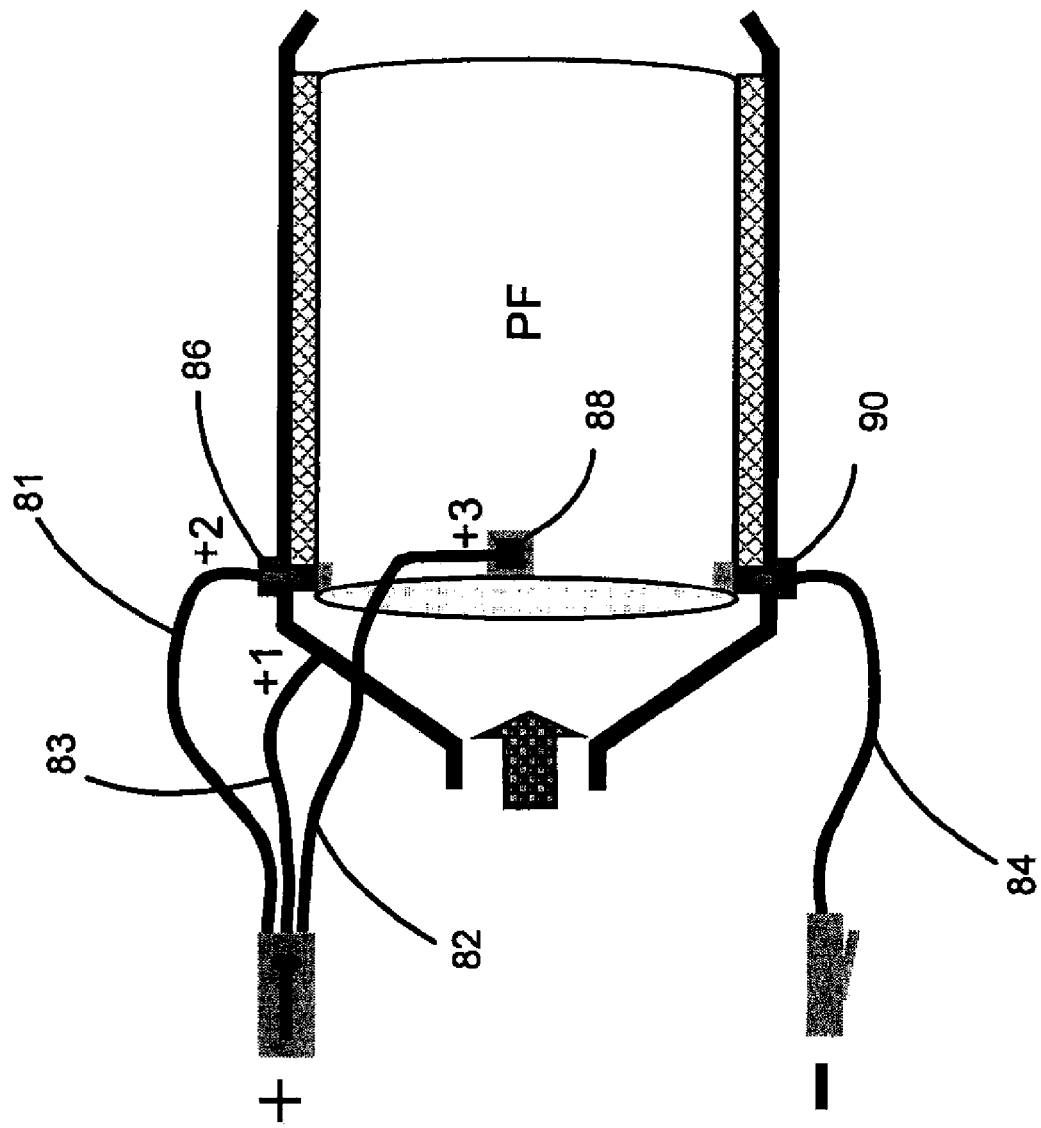
FIG. 5 is a side view of the particulate filter including the electrical connections to the particulate filter.

For purposes of clarity, the remainder of the disclosure will be discussed in the context of FIG. 4A. As shown in FIG. 4A, the grid 64 is divided into three zones 74-76. Resistive pathways 77-79 are formed to the grid 64 in a spiral pattern within the zones 74-76. The zones are separated by non-conductive material 80, 81. As shown in FIG. 5, electrical terminals 86-90 are individually located at each of the three zones 74-46. Electrical energy is supplied via insulated wires 82-84 to each of the electrical terminals 86-90. It is appreciated that each of the zones may be heated sequentially, all at once, or on an as needed basis.

Figure 6:
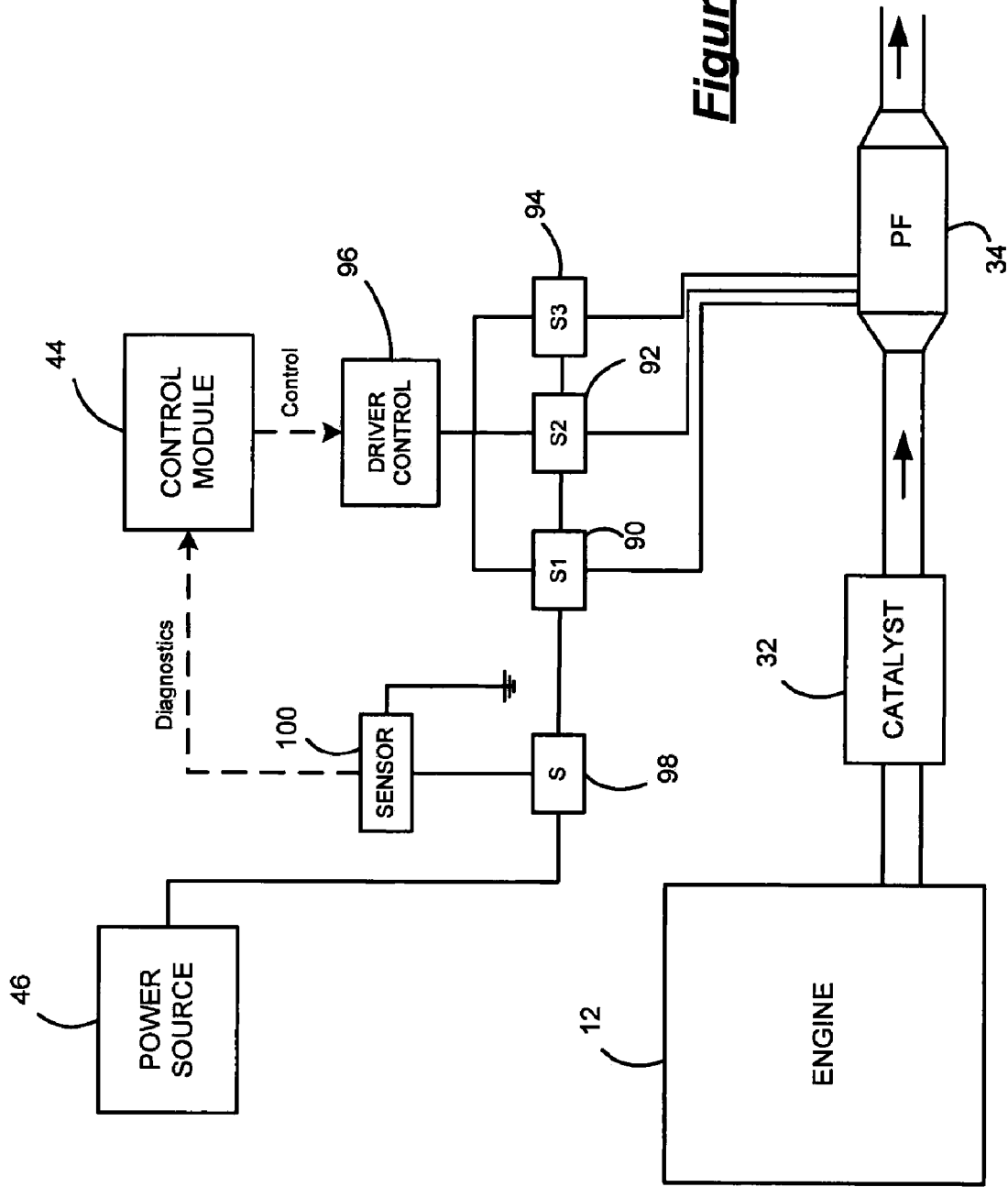
FIG. 6 is a functional block diagram illustrating a method of connecting the particulate filter to the power source.

With reference to FIGS. 4A, 5, and 6, electrical energy is supplied to each of the electrical terminals 86-90. The control module 44 controls the heating of each zone 74-46 individually. A plurality of switches 90-94 can be activated and deactivated to allow current to flow to each zone 74-46. For example, voltage is supplied via the power source 46 to the plurality of switches 90-94. A switch driver control unit 96 is controlled by the control module 44 to activate and deactivate each of the switches 90-94. An additional switch 98 may be added to allow a sensor 100 to sense the voltage and/or current supplied by the power source 46. This can be done for diagnostic purposes. Based on the diagnosis, the control module 44 controls the activation and deactivation of the switches 90-94.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An exhaust system that processes exhaust generated by an engine, comprising:
   a particulate filter (PF) that is disposed downstream of the engine and that filters particulates from the exhaust; and
   a grid that includes electrically resistive material that is segmented by non-conductive material into a plurality of zones and wherein the grid is applied to an exterior upstream surface of the PF.

2. The system of claim 1 further comprising a plurality of electrical connections that selectively supply current to the electrically resistive material located within the plurality of zones.

3. The system of claim 1 wherein the electrically resistive material is applied to the exterior upstream surface of the PF using thick film heating.

4. The system of claim 1 wherein the electrically resistive material includes at least one of Silver and Nichrome.

5. The system of claim 1 wherein the particulate filter includes a conductive coating that is applied to the exterior upstream surface of the PF wherein the electrically resistive material of the grid contacts the conductive coating and wherein the electrically resistive material transfers thermal energy to the conductive coating to initiate combustion of particulates present on the surface of the PF.

6. The system of claim 1 wherein the particulate filter includes a wall monolith particulate trap that includes a plurality of opened channels and a plurality of closed channels.

7. The system of claim 6 wherein the particulate filter includes a conductive coating applied to the inlets of the plurality of opened and closed channels wherein the conducting coating extends down an upstream portion of the opened channels and wherein the electrically resistive material transfers thermal energy to the conductive coating to initiate combustion of particulates present in the upstream portion of the PF.

8. The system of claim 1 wherein pathways of electrically resistive material are formed in single path patterns within each zone of the grid.

9. The system of claim 1 wherein pathways of electrically resistive material are formed in multi-path patterns within each zone of the grid.

10. An exhaust system that processes exhaust generated by an engine to regenerate a particulate filter, comprising:
    a particulate filter (PF) that is disposed downstream of the engine and that filters particulates from the exhaust;
    a grid that includes electrically resistive material that is segmented by non-conductive material into a plurality of zones and wherein the grid is applied to an exterior upstream surface of the PF;
    a plurality of switches disposed between a power source and the plurality of zones; and
    a control module that selectively activates and deactivates the plurality of switches to supply electrical energy to selectively heat the plurality of zones wherein the heat initiates regeneration of particulates in the PF.

11. The system of claim 10 further comprising a sensor that senses at least one of voltage and current from the power supply and wherein the control module diagnosis the power source based on the sensed at least one of voltage and current.

12. The system of claim 11 wherein the control module selectively activates and deactivates the plurality of switches based on the diagnosis of the power supply.

13. The system of claim 10 wherein the control module selectively activates and deactivates the plurality of switches during an initial period of a PF regeneration cycle.

14. The system of claim 13 wherein the control module estimates an amount of particulates within the PF and wherein the electrical energy is supplied when the amount exceeds a threshold amount.

15. The system of claim 10 wherein pathways of electrically resistive material are formed in single path patterns within each zone of the grid.

16. The system of claim 10 wherein pathways of electrically resistive material are formed in multi-path patterns within each zone of the grid.

17. The system of claim 10 wherein the grid is segmented into a first centrally located zone and at least one outer zone located concentrically therefrom.

18. The system of claim 10 wherein the grid is segmented into equally divided zones.

* * * * *